United States Patent [19]

Isoguchi et al.

[11] Patent Number: 5,146,353
[45] Date of Patent: Sep. 8, 1992

[54] STILL VIDEO CAMERA WITH A PLAYBACK FUNCTION AND SOUND RECORDING FEATURE

[75] Inventors: Seiichi Isoguchi, Machida; Masaaki Tsuchida, Hachioji; Yoshitaka Ohta, Hachioji; Tomoaki Tamura, Hachioji, all of Japan

[73] Assignee: Konica Corporation, Tokyo, Japan

[21] Appl. No.: 616,100

[22] Filed: Nov. 20, 1990

[30] Foreign Application Priority Data

Nov. 29, 1989 [JP] Japan .................. 1-307734

[51] Int. Cl.⁵ .................. H04N 5/225; H04N 5/30
[52] U.S. Cl. .................. 358/909; 358/906; 358/210
[58] Field of Search .............. 358/906, 209, 210, 409; 354/219; 360/35.1

[56] References Cited

U.S. PATENT DOCUMENTS

| | | | |
|---|---|---|---|
| 3,833,758 | 9/1974 | Ferrari | 358/906 |
| 4,163,256 | 7/1979 | Adcock | 358/906 |
| 4,541,010 | 9/1985 | Alston | 358/909 |
| 4,716,465 | 12/1987 | Meyer | 358/210 |
| 4,800,448 | 1/1989 | Kaneko et al. | 360/35.1 |
| 4,807,051 | 2/1989 | Ogura | 358/341 |
| 4,812,922 | 3/1989 | Minoura et al. | 360/14.1 |
| 4,858,012 | 8/1989 | Hino et al. | 358/909 |
| 4,894,731 | 1/1990 | Nakasuna et al. | 358/906 |
| 4,999,714 | 3/1991 | Vogel et al. | 358/906 |
| 5,062,010 | 10/1991 | Saito | 360/35.1 |

FOREIGN PATENT DOCUMENTS 2225687A 6/1990 United Kingdom.
2235347A 2/1991 United Kingdom.

OTHER PUBLICATIONS

Japanese Abstract of Japanese Patent Publication No. 59-183582 Oct. 18, 1984.

Primary Examiner—Michael Razavi
Assistant Examiner—Wendy R. Greening
Attorney, Agent, or Firm—Finnegan, Henderson, Farabow, Garrett and Dunner

[57] ABSTRACT

A still video camera provided with a mode selector to select an operation mode, a trigger generator to generate a trigger signal and a video recorder to record a visual image of the subject and to reproduce the recorded image. When the record-play mode is selected by the mode selector, the video recorder responds to the trigger signal from the trigger generator to record a frame of the visual image of the subject. The recorded frame of the visual image of the subject is then played back. This sequence can be repeated at the direction of the operator, at predetermined time intervals, or in response to a sound amplitude greater than a predetermined level. The still video camera is also capable of recording and playing back sound to accompany the still picture.

12 Claims, 17 Drawing Sheets

STILL VIDEO CAMERA WITH A PLAYBACK FUNCTION AND SOUND RECORDING FEATURE

BACKGROUND OF THE INVENTION

The present invention relates to a still video camera, and more particularly to improvements in recording and playing back motions of a still video camera having the function of recording and playing back.

Recently a still video camera has been put into practical use replacing a film-type camera, which still video camera is composed in such a manner that: optical image signals from a photographic object are converted into electric image signals by an image pick-up element; and the electric image signals are recorded in a recording medium such as a magnetic disk which corresponds to a conventional photographic film. In this type of still video camera, electric image signals recorded in a recording medium are played back by a monitor so that they can be observed, or copied by a printer. (Refer to Japanese Patent Application Open to Public Inspection No. 183582/1984.)

Still video cameras in which not only an image but also a sounds corresponding to the image can be recorded, have been developed, and some of them are composed in such a manner that: the sounds corresponding to a recording image can be automatically recorded for a predetermined period of time from the moment when a shutter button has been pressed Further a still video camera has been developed which can play back recorded images only by connecting a monitor with the still video camera.

In the above-described still video camera having the playback function, playback can be conducted only when a photographer operates the switches, so that it is cumbersome to play back the recorded images or the sounds) right after photographing.

The present invention has been accomplished to solve the above-described problems. It is an object of the invention to provide a still video camera having the recording and playback function, by which playback can be automatically conducted consecutively to recording, specifically a recorded image can be played back right after an image has been recorded, so that the burden of a photographer can be reduced and the maneuverability of the camera can be improved.

SUMMARY OF THE INVENTION

The still video camera of the invention having the function of recording and playback is provided with; a consecutive recording and playback means by which recording and playback of the recorded signals can be consecutively conducted according to a predetermined trigger signal; and a selecting means by which the operation of the above-described recording and playback means can be selected.

In this case, the predetermined trigger signal by which the above-described consecutive recording and playback means is started, may be periodically outputted from an interval trigger signal output means which can output a trigger signal at variable intervals.

When the still video camera is provided with a microphone, a sound level trigger signal output means may be provided to the camera which outputs the above-described predetermined trigger signal only when the inputted sound signal exceeds a predetermined level.

Further, a remote control means may be provided which is installed separately from the still video camera and outputs the predetermined trigger signal by wireless transmission.

Furthermore, the still video camera may comprise a sound recording and playback means.

In the still video camera having the function of recording and playback as described above, when the operation of the consecutive recording and playback means has been selected by the selecting means, the consecutive recording and playback means conducts recording and playing back the recorded signal consecutively according to a predetermined trigger signal.

Specifically, when the operation of the consecutive recording and playing back means has been selected by the selecting means, not only recording is conducted by a predetermined trigger signal, but also the recorded signal is automatically played back consecutively to the recording.

In this case, the interval trigger signal output means outputs a predetermined trigger signal to start the above-described consecutive recording and playing back means at constant intervals which can be variably set, and the interval trigger signal output means repeatedly conducts recording and playing back the recorded signal at the above-described constant intervals.

When the still video camera is provided with a microphone, the sound level trigger signal output means outputs the above-described trigger signal when the sound signal inputted into the microphone exceeds a predetermined level, and when the sound signal inputted into the microphone of the still video camera exceeds a predetermined level, recording and playing back of the recorded signal are consecutively conducted.

Further, the remote control means is provided separately from the still video camera and outputs the above-described trigger signal by wireless transmission so that the still video camera can record images and play black the recorded image in accordance with remote control.

The still video camera may be provided with not only the means to record and play back images but also the means to record and play back sounds in accordance with the images. In this case, recording of images and sounds, and playing back the recorded images and sounds can be consecutively conducted.

DETAILED DESCRIPTION OF THE INVENTION

Figure 1:
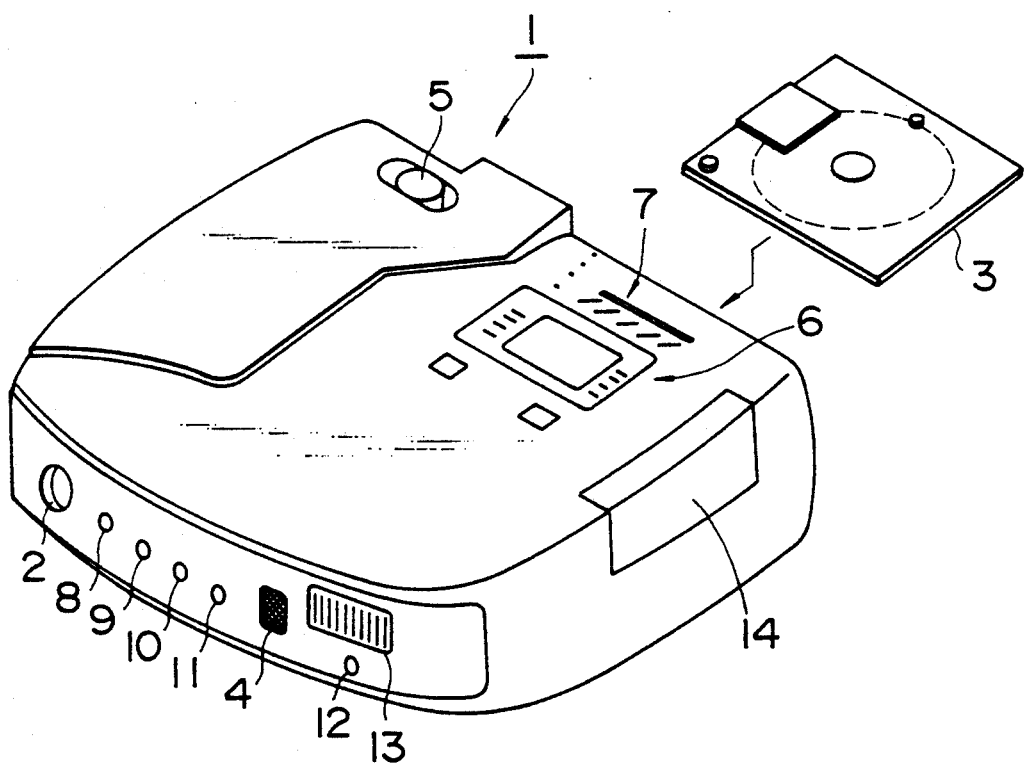
FIG. 1 and FIG. 2 are perspective views which shows the appearance of the still video camera Of the present invention.

Referring now to the drawings, an example of the present invention will be described as follows.

Figure 2:
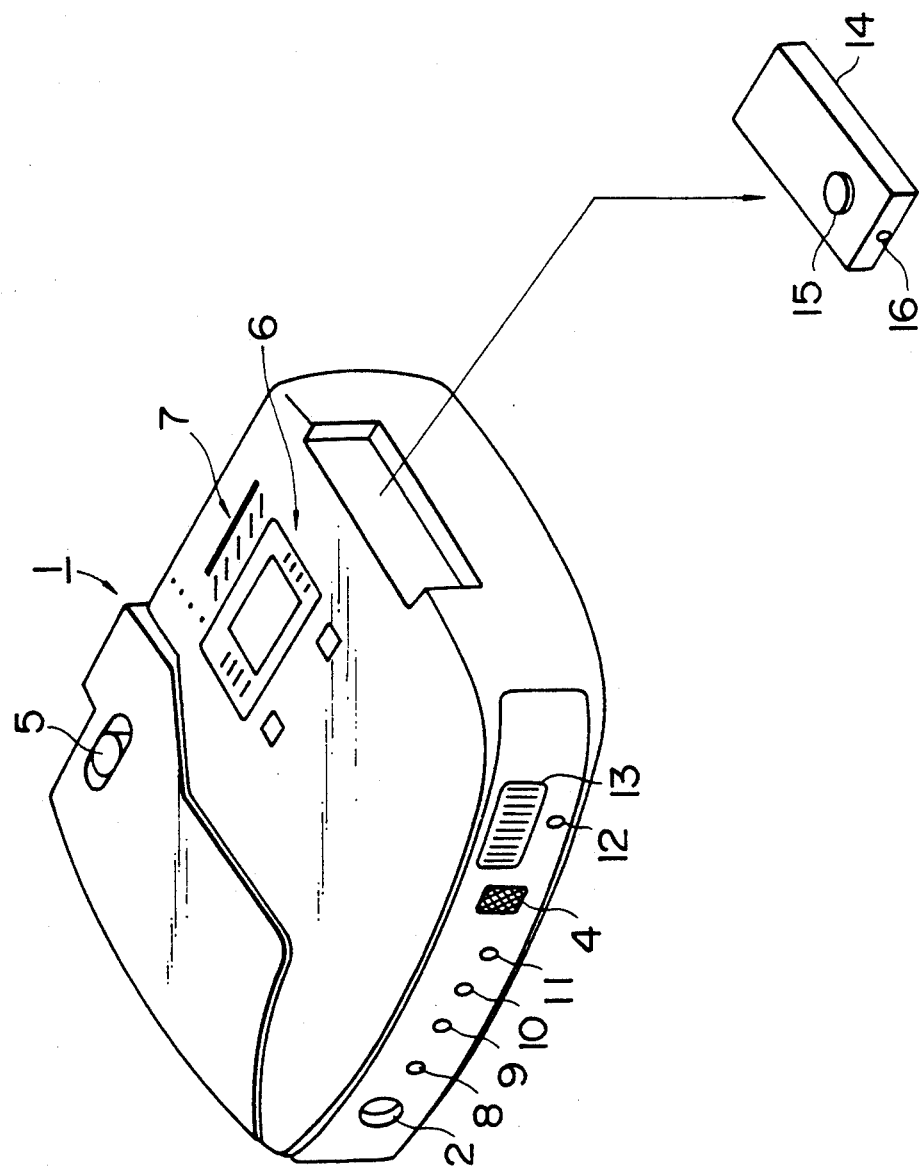

First of all, the appearance of the still video camera of the present invention is illustrated in FIG. 1 and FIG. 2.

In FIG. 1 and FIG. 2, the photographing operation of the still video camera 1 is conducted as follows. Optical image signals obtained by the picture-taking lens 2 are converted into electric image signals by image sensors such as CCDs which are built in, and the electric image signals are recorded in the floppy disk 3 by analog recording, which floppy disk is a detachable recording medium. When image signals are recorded in the way described above, sound signals outputted from the microphone 4 which is provided on the same side as the picture-taking lens 2, are also recorded in the floppy disk 3 by analog recording. The still video camera of the invention has the function of playing back the image and sound recorded in the above-described floppy disk 3. The recording of the above-described sound signals starts synchronously with the start of image recording and automatically continues for a predetermined period of time, wherein the recorded sound signals are not limited to human voice.

The release button 5, when it is pressed, the recording of image and sound starts, is provided on the upper surface of the still video camera 1. The liquid crystal display 6 and operating unit 7 are provided in the proximity of the release button 5 so that various photographing information can be displayed and the photographing conditions can be set.

The picture-taking lens 2, the lens 8 for use in a viewfinder provided on the rear side not illustrated in the drawing, the photometry lens 9, the remote control light receiving lens 10, LED 11 for use in displaying the photographing conditions by a self-timer, the stroboscopic photographing lens 12 and strobe light 13 are provided on the front side of the camera main body.

The remote control switch box 14 which is used for transmitting remote control signals and which is formed independently of the camera main body, is provided to a cut-out portion formed on the left side of the camera main body with regard to the photographic subject, wherein the remote control switch box 14 can be easily attached to and detached from the camera main body. FIG. 1 illustrates the state in which the remote control box 14 is attached to the camera main body and FIG. 2 illustrates the state in which the remote control box 14 is detached from the camera main body.

As illustrated in FIG. 2, the remote control switch box 14 is provided with the remote control transmitting switch 15 and the infrared ray emitting LED 16 which emits modulated optical signals. When the remote control transmitting switch 15 is pressed, remote control signals of infrared rays are emitted. When the remote control signals are received by the remote control light receiving lens 10 of the still video camera 1, remote control can be conducted.

Figure 3:
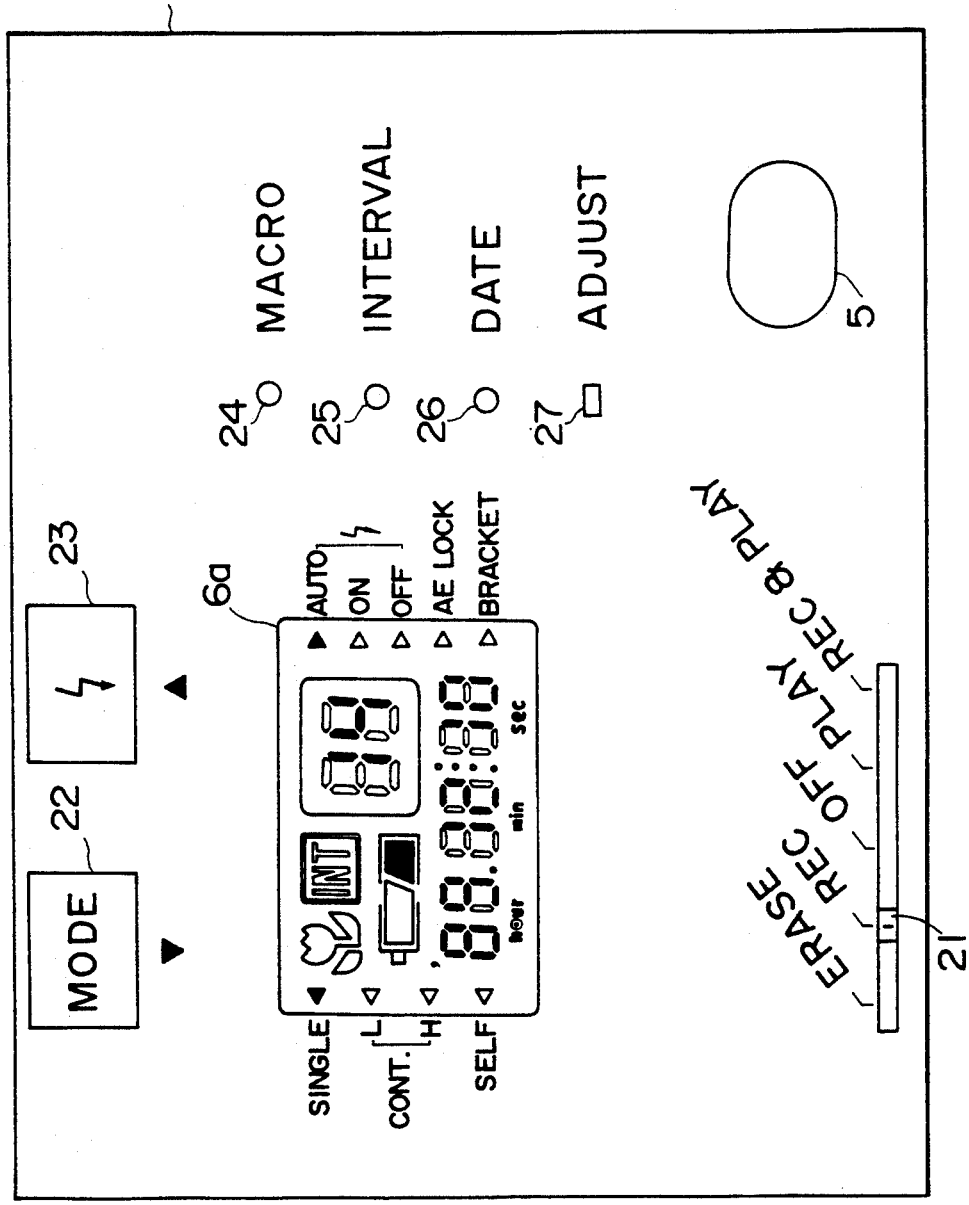
FIG. 3 is a plan view which shows an operation unit and displaying unit of the still video camera illustrated in FIG. 1 and FIG. 2.

Referring to FIG. 3, the detail of the above-described displaying liquid crystal unit 6 and the operation unit 7 will be explained as follows.

The slide switch 21, which is a selecting means, selects a mode among the photographing mode (REC), the playback mode (PLAY), the erasing mode (ERASE), the automatic photographing and playback mode (REC & PLAY in the drawing). When the above-described slide switch 21 is turned off, electric power is not supplied to the camera, there is not anything displayed on the displaying crystal liquid 6 and the camera does not accept any switching operation. The above-described automatic photographing/playback mode (REC & PLAY) corresponds to the continuous recording and playback means in this example.

Next, the function of each switch will be explained when the slide switch 21 is set at the position of REC so that photographing can be conducted by operating the release button 5, which is a common photographing mode.

When the camera is in the photographing mode, every time the mode switch 22 is pressed once, the triangle mark shown on the left side of the displaying window in FIG. 3, is moved in such a way that: SINGLE→CONT., L→CONT., and H→SELF so that the mode can be selected among a single shot, a low speed continuous shot, a high speed continuous shot and a self-timer shot. When the mode switch 22 is further pressed, the triangle mark is returned from the position of SELF to the position of SINGLE.

The strobe switch 23 is a switch by which the exposure mode is changed, wherein the exposure mode is selected among the automatic strobe light emitting mode, the forced strobe light emitting mode, the strobe light OFF mode, the AE lock mode and the bracket photographing mode. Every time the strobe switch 23 is pressed once, the triangle mark on the right side of the displaying window 6a is moved in such a way that: AUTO→ON→OFF→AE LOCK→BRACKET, so that the selected mode can be displayed.

MACRO switch 24 is a switch which sets the picture-taking lens to short distance photographing or standard distance photographing. In case a photographer touches the switch 24 carelessly, the control circuit is composed in such a manner that: the switch 24 functions only when it is pressed for more than 0.5 sec. When the MACRO photographing mode is selected by MACRO switch 24, the picture-taking lens 2 is set to the short distance photographing position and a flower mark located at the upper left of the displaying window 6a is lit.

INTERVAL switch 25 is a switch which is used for changing over to the interval photographing mode and setting the photographing conditions. Every time INTERVAL switch 25 is pressed, the photographing interval by hour, minute and second can be set and the photographing number can be set. When the value of each condition is set, the setting number can be increased and decreased by pressing the mode switch 22 and the strobe switch 23. In the same way as the above-described MACRO switch 24, INTERVAL switch 25 is changed over to the interval photographing mode only when INTERVAL switch 25 is pressed for more than 0.5 sec, and INT mark located on the right side of the above-described flower mark in the displaying window 6a is lit.

DATE switch 26 is a switch which is used for changing over the displaying mode of the date, wherein every time the switch is pressed, the display located at the lower portion of the displaying window 6a is changed in such an order that: month, day, year→day, month, year→year, month, day→day, hour minute →no display.

ADJUST switch 27 is a switch which is used for changing the mode when the date or time is changed and when the item to be changed is selected. After the information of year, month, day, hour or minute has been elected by ADJUST switch 27, can be changed by operating the mode switch (the down switch) 22 and the strobe switch (the up switch) 23 in such a manner that the number is increased and decreased.

Figure 4:
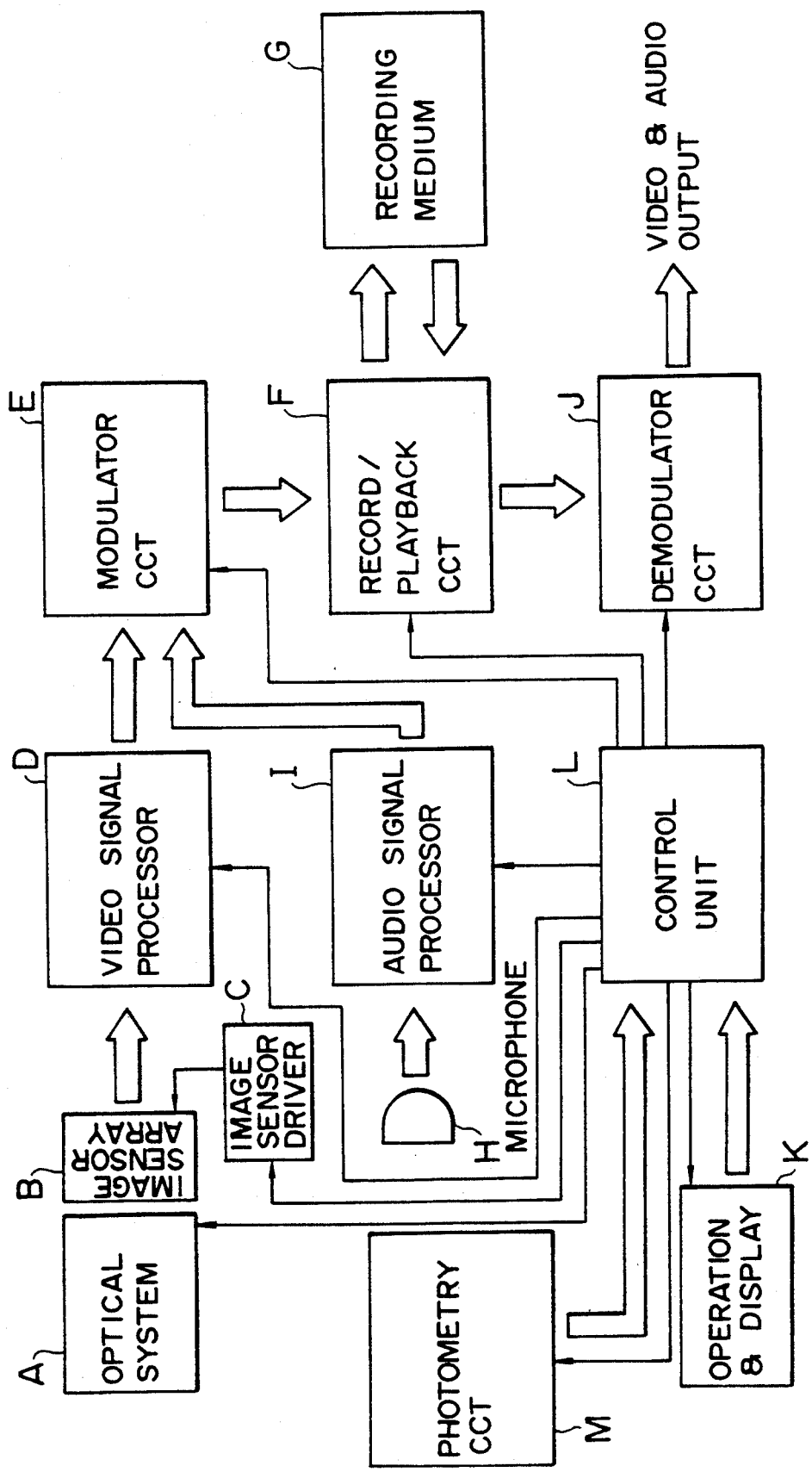
FIG. 4 is a block diagram which shows a basic circuit composition of the still video camera in the above example.

Other than the various displays described above, a dry battery mark to indicate the consumption of a battery and a two digit counter display to indicate the number of photographed pictures are provided to the above-described indicating window 6a. FIG. 4 is a block diagram which shows the outline of the system composition of the above-described still video camera 1.

An optical image signal from a photographic object forms an image on solid state image sensor B such as a CCD through optical system A such as a lens and a diaphragm.

Electric image signals which have been read out from image sensor B by image sensor driver C, are processed in video signal processor D in such a manner that: luminance signals are separated from color difference signals. When these signals are magnetically recorded, the signals are F/M-modulated, and when the signals are digitally recorded, they are A/D-converted in modulator circuit E, so that the signals can be recorded in recording medium G such as a floppy disk and a semiconductor storage.

On the other hand, sound signals outputted from microphone H are processed in audio signal processor I in such a way as amplifying and compressing the time axis. After that, the sound signals are recorded by recording medium G through modulator CCT and record/playback CCT F in the same way as the image signals.

When signals are reproduced, the signals are read out from recording medium G by record/playback CCT F, and after the readout signals are converted into image signals and sound signals and by demodulator CCT through an inverse process to recording, they are outputted.

The above-described operations are controlled by control unit L through operation and display unit K. Signals are inputted from photometry CCT M to control unit L and at the same time the operation of photometry CCT M is controlled by control unit L.

Figure 5:
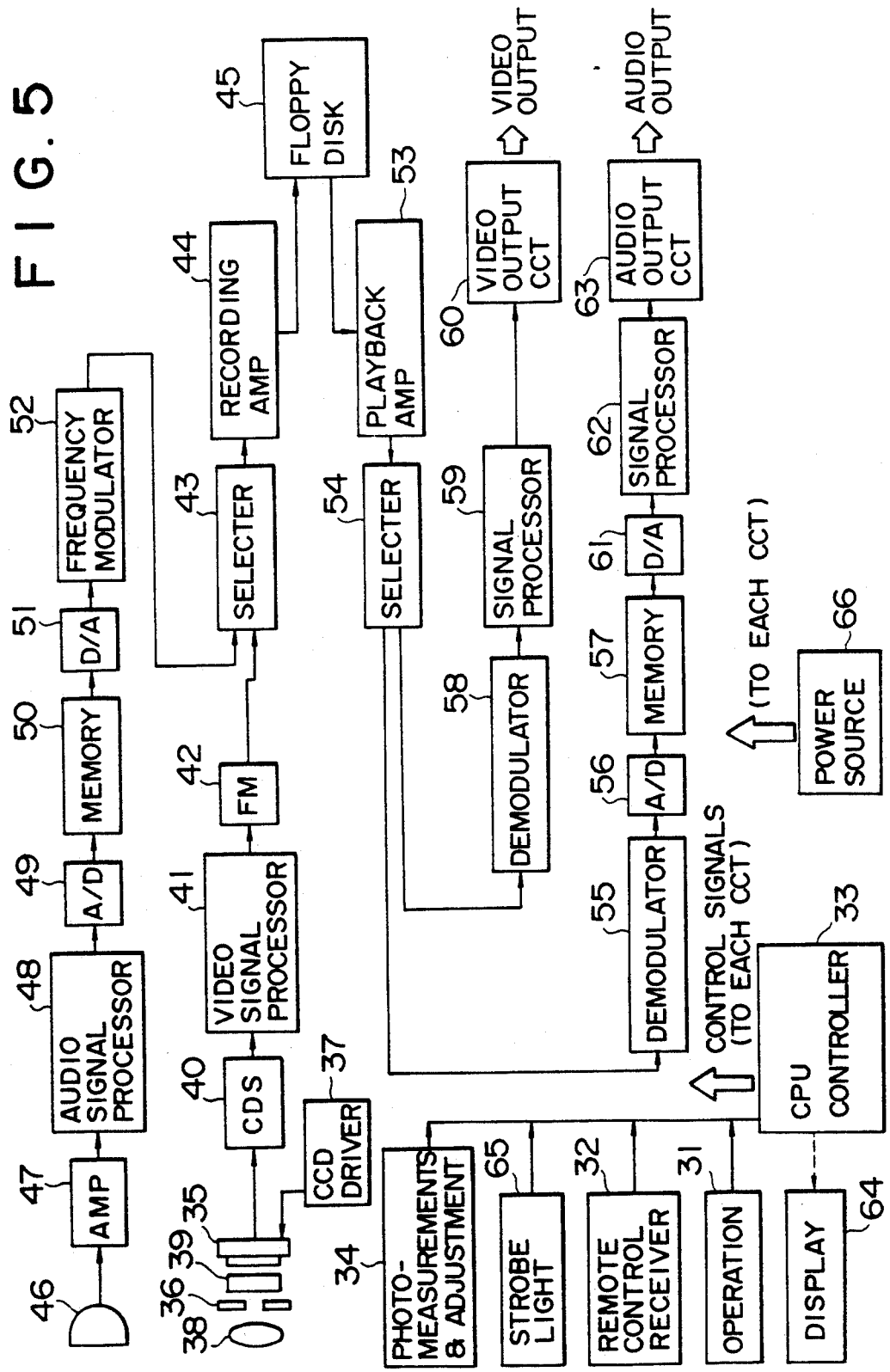
FIG. 5 is a block diagram in which the composition of the circuit illustrated in FIG. 4 is shown in detail.

FIG. 5 is a block diagram which shows the system of a still video camera in more detail in which a 2 inch floppy disk (a magnetic disk) is used as recording medium G in FIG. 4. Referring now to FIG. 5, the system of recording and playback will be explained in more detail.

When the signals outputted from the operation unit 31 or the signals outputted from the remote control receiver 32 are inputted into the CPU controller 33, the sequence control starts. The CPU controller 33 controls the diaphragm 36 and CCD driver 37 according to the output of photo-measurement and adjustment CCT so that the output of CCD 35 can become adequate. The optical image signals form an image on CCD 35 through the lens 38, the diaphragm 36 and the optical filter 39.

The electrical image signals read out from CCD 35 by CCD driver 37 pass through CDS circuit (the correlation double sampling circuit) 40 and are converted into illuminance signals and color difference signals in the video signal processor. These illuminance signals and color difference signals are emphasis-processed, FM-modulated and synthesized in FM modulation circuit 42 and outputted into the recording amplifier 44 through the selector 43. Then, the signals are magnetically recorded in the floppy disk 45 through the recording amplifier 44.

On the other hand the sound signals outputted from the microphone 46 are amplified by the amplifier 47 and further processed in the audio signal processor 48 for noise reduction. After that, the signals are A/D converted by the A/D converter 49 and stored temporarily in the memory 50 in the form of digital signals. The digital signals stored in the memory 50 are read out at a faster speed than the speed at which the signals were written in the memory 50. These read-out signals are D/A converted by the D/A converted by the D/A converter 51 so that the signals can be converted into time-compressed analog signals.

The time-compressed analog signals, which are the sound signals, are emphasis-processed and FM-modulated in the frequency modulator 52 in the same way as the image signals, after that they are recorded in the floppy disk 45 through the selector 43 and the recording amplifier 44. The above-described selector 43 selects the signals between the recording image signals and the recording sound signals.

The sequence of playback process starts when signals are outputted from the remote control receiver 32 and the output from the operation unit 31 is received. First of all, the sound signals are read out from the floppy disk 45 through the playback amplifier 53 and inputted into the demodulator 55 by the selector 54. In the demodulator 55, the processing of demodulation and diemphasis is conducted on the sound signals read out from the floppy disk 45. Then, the processed signals are A/D-converted by the A/D converter 56 and temporarily stored in the memory 57 in the form of digital signals.

Then, the image signals corresponding to the sound signals which have been read out from the above-described floppy disk 45, are read out from the floppy disk 45 through the playback amplifier 53, and the read-out signals are outputted to the demodulator 58. The process of demodulation and diemphasis is conducted on the image signals in the demodulator 58, and the processed signals are converted into video signals in the signal processor 59 and outputted through the video output CCT 60.

While the video signals are being outputted from the video output CCT 60, the digital data of the sound signals stored in the memory 57 are read out at a speed so that the sound signals can be returned to the actual time, and the read-out data is converted into analog signals by the D/A converter 61 so that they can be outputted as sound signals through the signal processor 62 and the audio output CCT 63.

The CPU controller 33 in which a microcomputer is built, controls each circuit relating to recording and playback, and at the same time the CPU controller 33 makes the display unit 64 display the information relating to the photographing conditions and the number of photographed frames which were set through the operation unit 31. The CPU controller 33 also controls the emission of strobe light 65 according to the setting to the operation unit 31.

Electric power is supplied to the above-described circuits by the power source 66.

Figure 6:
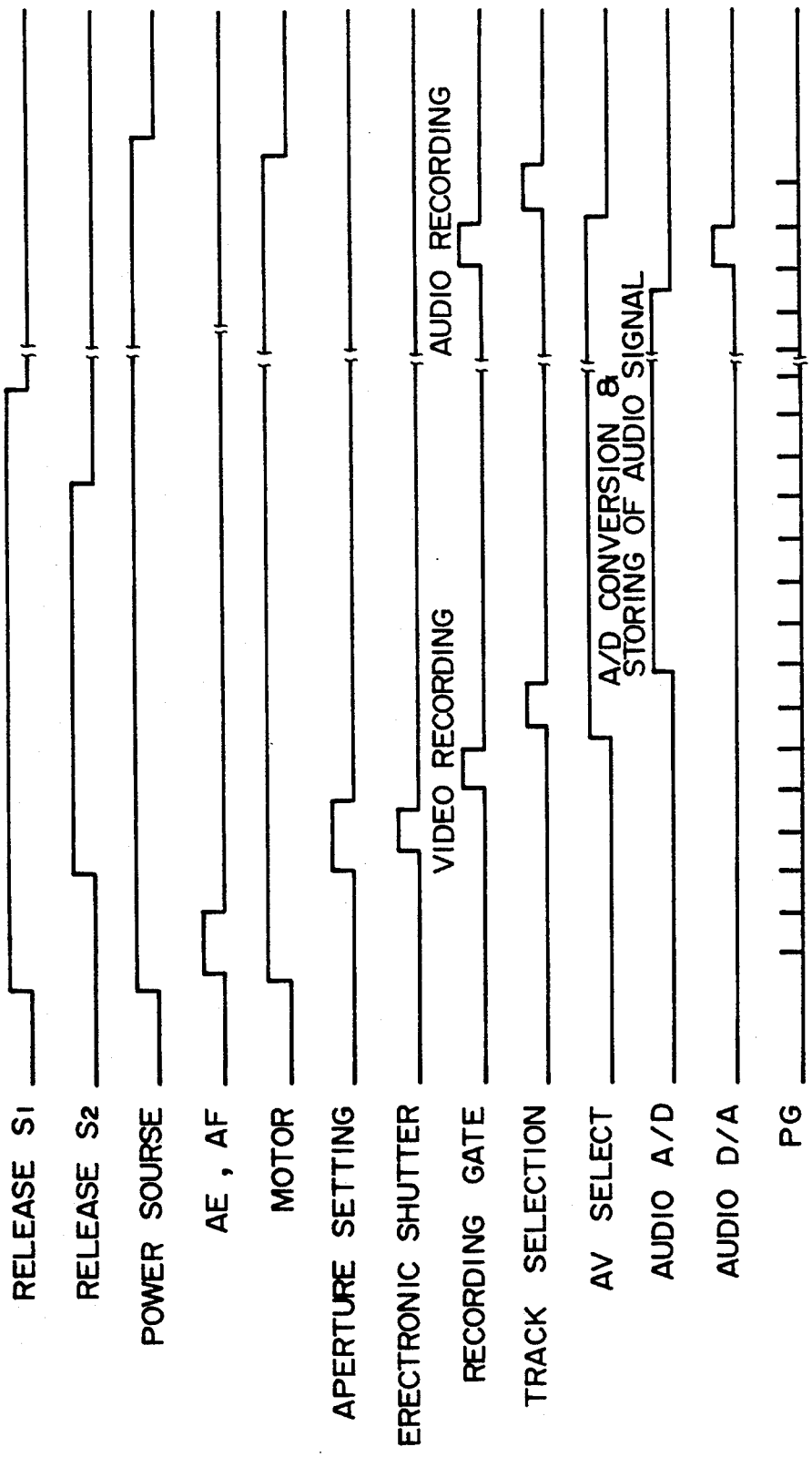
FIG. 6 is a time chart of image and sound recording process in the above example.

Referring now to the time chart shown in FIG. 6, the recording motions of the still video camera of this example illustrated in FIG. 5 will be explained as follows.

When the first stroke $S_1$ of the camera release button is conducted, the power source is turned on and a spindle motor, which is not illustrated in the drawing, is turned on so that the floppy disk 45 can be rotated.

Then the illuminance of a photographic object and distance from the camera to the object are measured (AE,AF), and a focus lens is adjusted for focusing.

When the second stroke $S_2$ of the release button is conducted, the diaphragm is set and an electronic shutter of CCD 35 is opened so that the photographic object can be photographed and electrical charge is accumulated at each pixel. After that, a recording gate is tuned on synchronously with PG signal which is the reference of recording in the floppy disk 45, so that the charge accumulated in CCD 35 is read out from the floppy disk 45 and processed. Then the FM modulated image signals are recorded in the floppy disk 45. At this moment, the image side of AV (sound and image) selector 43 is previously selected.

Next, AV selector 43 is changed over from image to sound and the head is shifted onto the next track on the floppy disk 45. The sound signals sent from the microphone 46 are amplified, and then signal processing such as noise reduction is conducted. After that, the signals are A/D converted and stored in the memory 50. Sound is recorded for a constant period of time, and after the constant period of time has passed, the sound signals are read out from the memory at a higher speed than that of recording. Then the sound signals read out from the memory are D/A converted so that they can be returned to analog signals. The analog signals are FM-modulated and the obtained data is recorded in the floppy disk 45 synchronously with PG. When recording has been completed, the head is moved to the next truck to prepare for the following photographing. After the spindle motor is turned off, the power source is turned off. In this way the sequence is completed.

Figure 7:
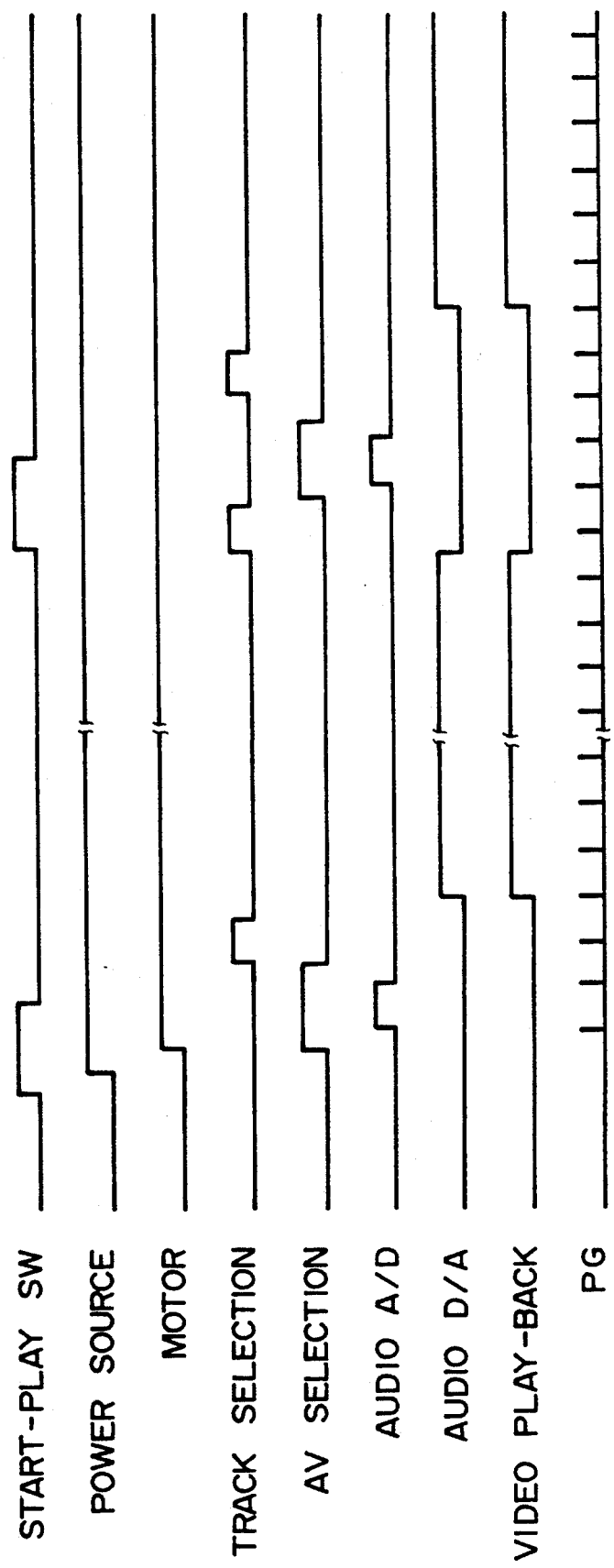
FIG. 7 is a time chart of image and sound playing back process in the above example.

Next, referring to the time chart shown in FIG. 7, playback motions will be explained as follows.

First of all, when the playback starting switch of a camera is turned on (the playback mode is selected by the slide switch 21 and a direction is given to start playback), the power source is turned on and the spindle motor for rotating the floppy disk 45 is turned on.

AV selector 54 is previously selected for the sound side. The sound signals are read out from the floppy disk 45 synchronously with PG signal which is the recording reference of the floppy disk 45. After the signals are FM-demodulated and A/D-converted, they are temporarily stored in the memory 57 in the form of digital signals.

Then AV selector 54 is changed over from sound to image, and the head is moved to the track in which images corresponding to the above-described sound signals are recorded. At this moment, the image signals are read out synchronously with PG signals. After FM modulation and encoding processing are conducted on the image signals, the image signals are outputted as video signals of NTSC system.

At this moment, the sound signals stored in the memory 57 are simultaneously read out at a lower speed than that of recording, and D/A converted. Then the processing of noise reduction is conducted on the signals and the sound signals are outputted.

When the playback starting switch is turned on again, the head is moved to the next sound track to prepare for the next playback, and image and sound can be simultaneously played back.

In the way described above, image and sound can be recorded and played back by the still video camera 1.

Next, the example will be explained as follows in which recording and playback according to the present invention are automatically conducted in accordance with a trigger signal.

Figure 8:
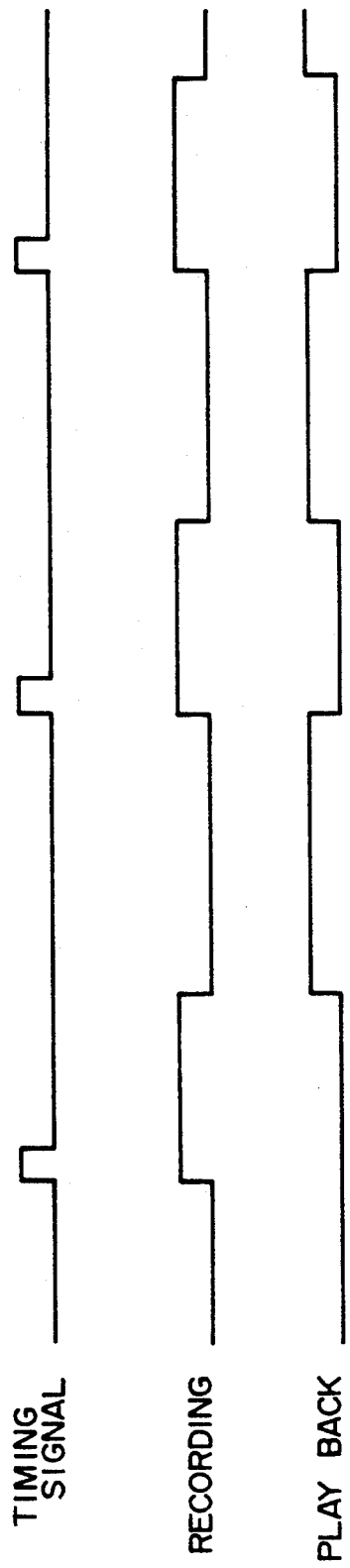
FIG. 8 is a time chart which shows the characteristics of control of the example in which recording and playback are periodically conducted at constant intervals.

In reference to the time chart illustrated in FIG. 8, the control by which recording and playback can be automatically conducted at a constant period.

The time chart illustrated in FIG. 8 shows the motions of a still video camera in which playback is automatically conducted at a constant period using a timer as a means to output trigger signals at regular intervals, wherein the timer is provided in a CPU which controls each circuit of a camera.

When changeover is conducted between recording and playback, abnormal current flows in the recording and reproducing head according to the circuit composition, so that the signals are disturbed by the noise caused by the abnormal current. It is preferable to select the mode between recording and playback after the recording and reproducing head was moved onto a track on which recording has not been conducted yet.

First of all, REC & PLAY Mode is selected by the slide switch 21 illustrated in FIG. 3. When INTERVAL Switch 25 is pressed for more than 0.5 sec, the figure display of minute in the display window 6a is turned on and off in order to urge the setting of interval time at which automatic recording and reproducing are conducted, as illustrated in FIG. 9, so that the figure of minute of interval time is set with the up-switch (the strobe switch 23) and the down-switch (the mode switch 22).

When the interval is set at 5 minutes, the up-switch is pressed 5 times so that the display of 5 minutes can be displayed in the display window. After that, INTERVAL Switch 25 is turned on. Then the figure display in the display window is turned on and off, which displays that the figure of minute has been determined. Next, the display of the figure of second is turned on and off, which urges the setting of the figure of second. (Refer to FIG. 10.) The setting of the figure of second is set in the same way as described before. When a desired time has been set in this way, INTERVAL Switch 25 is turned on so that the figure of second can be determined. (Refer to FIG. 11.)

Figure 9:
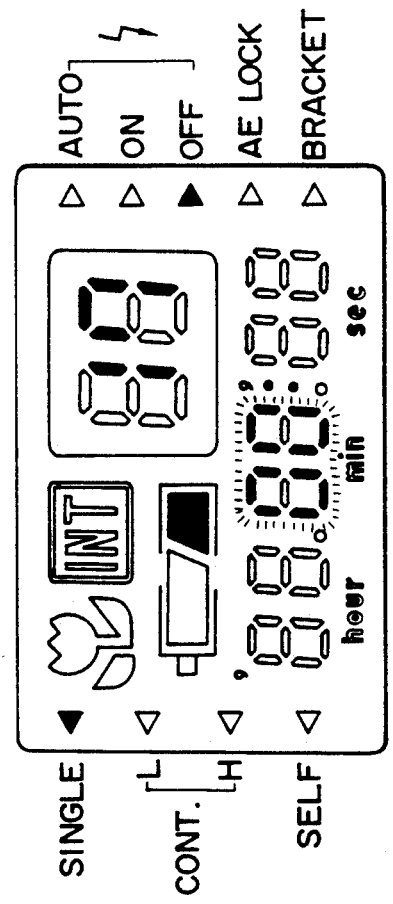
FIG. 9 to FIG. 11 are views which show the display unit in order to explain the setting manner of the period in the recording and playback control conducted at constant period illustrated in the above FIG. 8.
Figure 10:
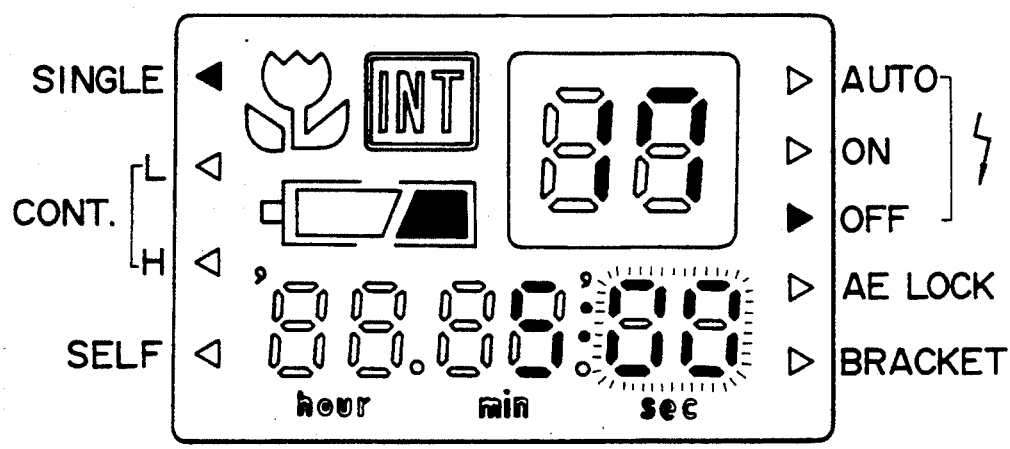
Figure 11:
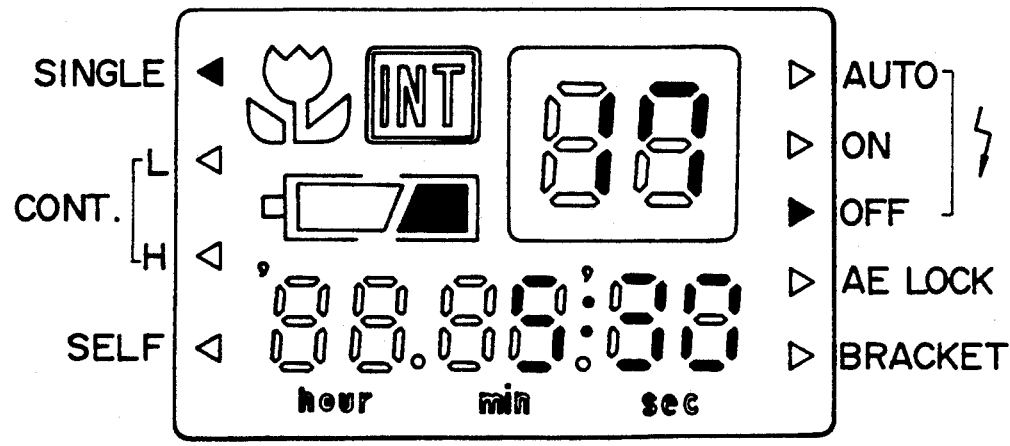

In the example illustrated in FIG. 9 to FIG. 11, the interval is set at 5 minutes 30 seconds. In this case, the timer output is outputted in the form of pulse-waves at every 5 minutes 30 seconds as illustrated in FIG. 8. The starting portion of the timer output is used as a trigger signal and recording, which includes recording of images and recording of sound for a constant period, is conducted. Right after recording has been completed, playback is automatically conducted until the following timer output is raised.

Consequently, when a monitor is connected with the still video camera 1, recording can be automatically conducted at regular intervals by the still video camera, and after recording, the recorded image can be automatically played back on the screen of the monitor, and furthermore sound signals accompanying the image can be played back if necessary. Accordingly, even if nobody operates the camera, recording and playback can be automatically conducted at regular intervals, so that images and sounds can be recorded at regular intervals in a party, for instance, and the updated recorded images and sounds can be played back at regular intervals. In the way described above, the still video camera 1 can be used as a display apparatus as well as a recording means.

Figure 12:
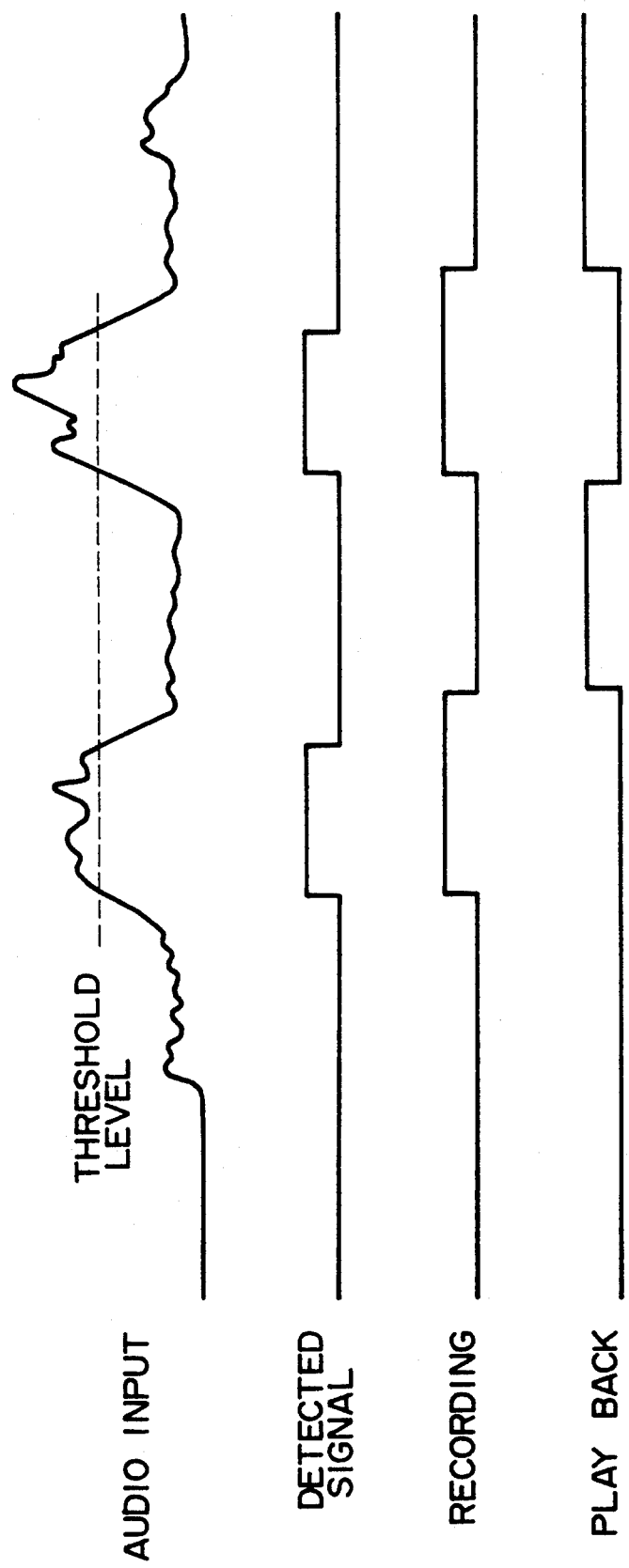
FIG. 12 to FIG. 13 are time charts which shows the motion of each unit when recording and playback are conducted comparing the sound level with a plurality of levels.

Next, automatic recording and playback according to the sound level detection will be explained referring to the time chart illustrated in FIG. 12.

When the mode of REC & PLAY is selected by the slide switch 21, which is a selecting means illustrated in FIG. 3, the detection signal which indicates that the microphone input level exceeds the setting level, is sent to a CPU, which is the control circuit 33 in FIG. 5. Automatic recording motions and automatic playback motions accompanying the recording motions can be carried out using the above-described sound level as a predetermined trigger signal.

Specifically, when the sound level exceeds the setting level, images and sounds are recorded in the floppy disk. Right after recording has been completed, the mode is automatically changed over to the playback mode. Until the sound level exceeds the setting level and the detection signal is outputted again, the playback of the above-described recorded images and sounds is continuously conducted. In this way, each time the input to the microphone exceeds the setting level, the images and sounds are recorded and the updated recorded image and sound can be automatically played back.

Figure 13:
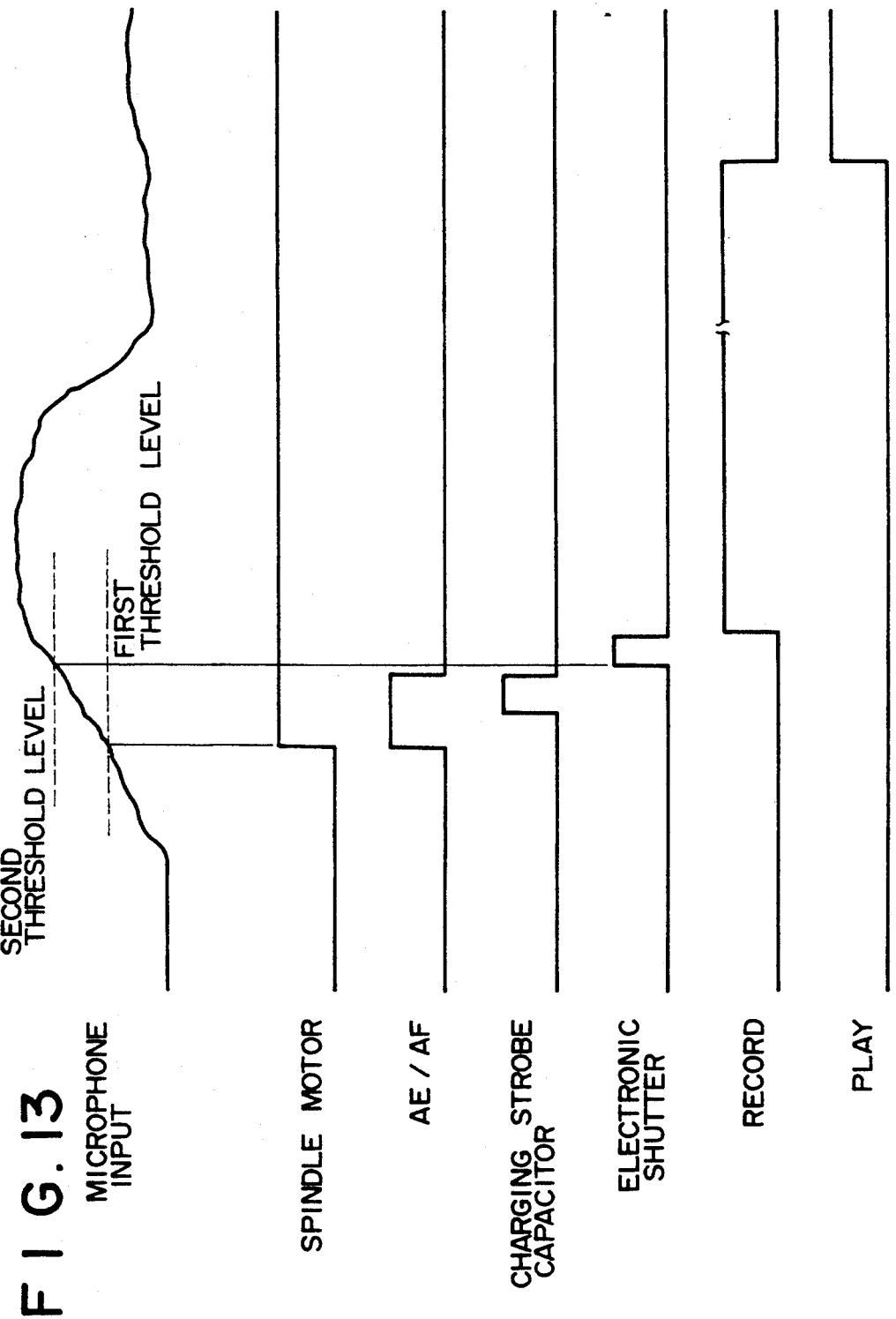

Referring to the time chart illustrated in FIG. 13, the automatic recording and playback control conducted in accordance with the input level of the microphone will be further explained in more detail. When the input level of the microphone exceeds the first setting level and the detection signal is outputted, a spindle motor, which is not illustrated in the drawing, for rotating the floppy disk 45, is turned on. Then, the illuminance of the photographic object and the distance from the camera to the object are measured (AE/AF). Focusing is conducted by adjusting a focus lens which is not illustrated. If necessary, the strobe unit 65 is charged to prepare for photographing.

When the input to the microphone 46 exceeds the second setting level, the electronic shutter of CCD 35 is activated so that photographing can be started. When various actuators which need much time for preparation is previously started in the way described above, time lag can be eliminated to conduct photographing.

When the input to the microphone 46 does not exceed the second setting level in a predetermined time after the input to the microphone 46 exceeds the first setting level, the spindle motor is turned off and the focusing lens is returned to the initial position.

As described above, in the still video camera of the present invention, images and sounds are recorded and played back every time the input level of the microphone 46 exceeds the setting level. Consequently, the still video camera of the present invention can be used as follows. For instance, every time a shout of joy is set up at a party place, the image and sounds in the party place can be recorded, and right after that, the recorded image and sound can be played back, so that everybody can participates in the party while the image and sound in the party are recorded and played back. Further the recorded image and sound can be automatically played back, so that the still video camera of the present invention can be enjoyed as an attractive display rather than the importance of recording.

Figure 14:
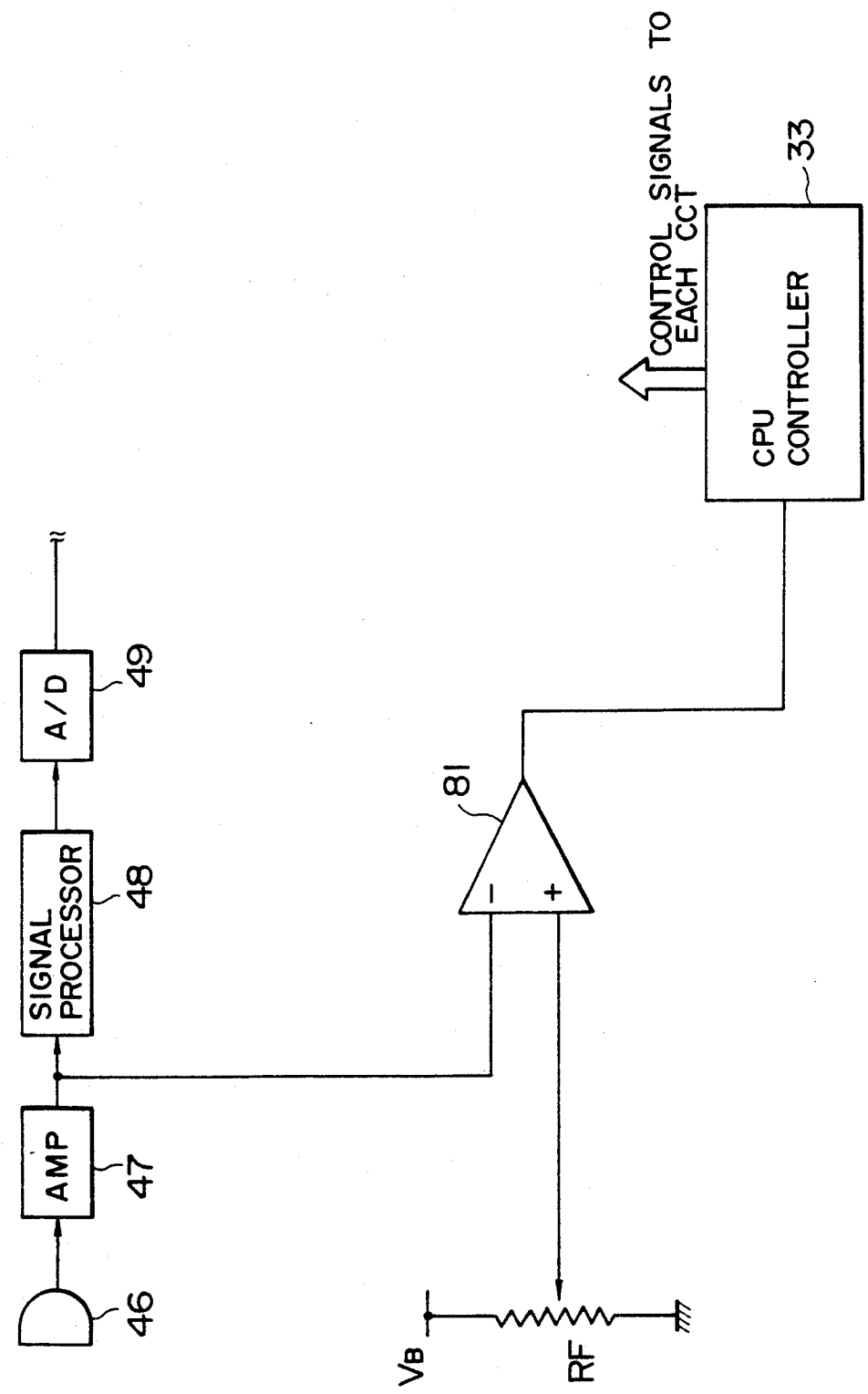
FIG. 14 to FIG. 16 are block diagrams which show the composition of the hard ware to detect the sound level.

Referring now to FIG. 14, the method to detect that the input level of the microphone 46 has exceeded the setting level, in other words, a sound level trigger signal outputting means will be explained. FIG. 14 is a partial block diagram of the total system block diagram illustrated in FIG. 5, so that like elements are shown by corresponding reference characters throughout the diagrams and explanations are omitted.

The sound signals sent from the microphone 46 are amplified by the amplifier 47. The amplified signals are inputted into the minus side of the comparator 81. The reference voltage which has been divided by variable resistance RF is impressed upon he plus side of the above-described comparator 81. The output of the comparator 81 is outputted into the CPU controller 33. When there is detected a sound signal, the sound level of which exceeds the setting level determined by variable resistance RF, the output of the comparator 81 is reversed, so that CPU controller 33 can detect that the sound level has exceeded the setting level.

Figure 15:
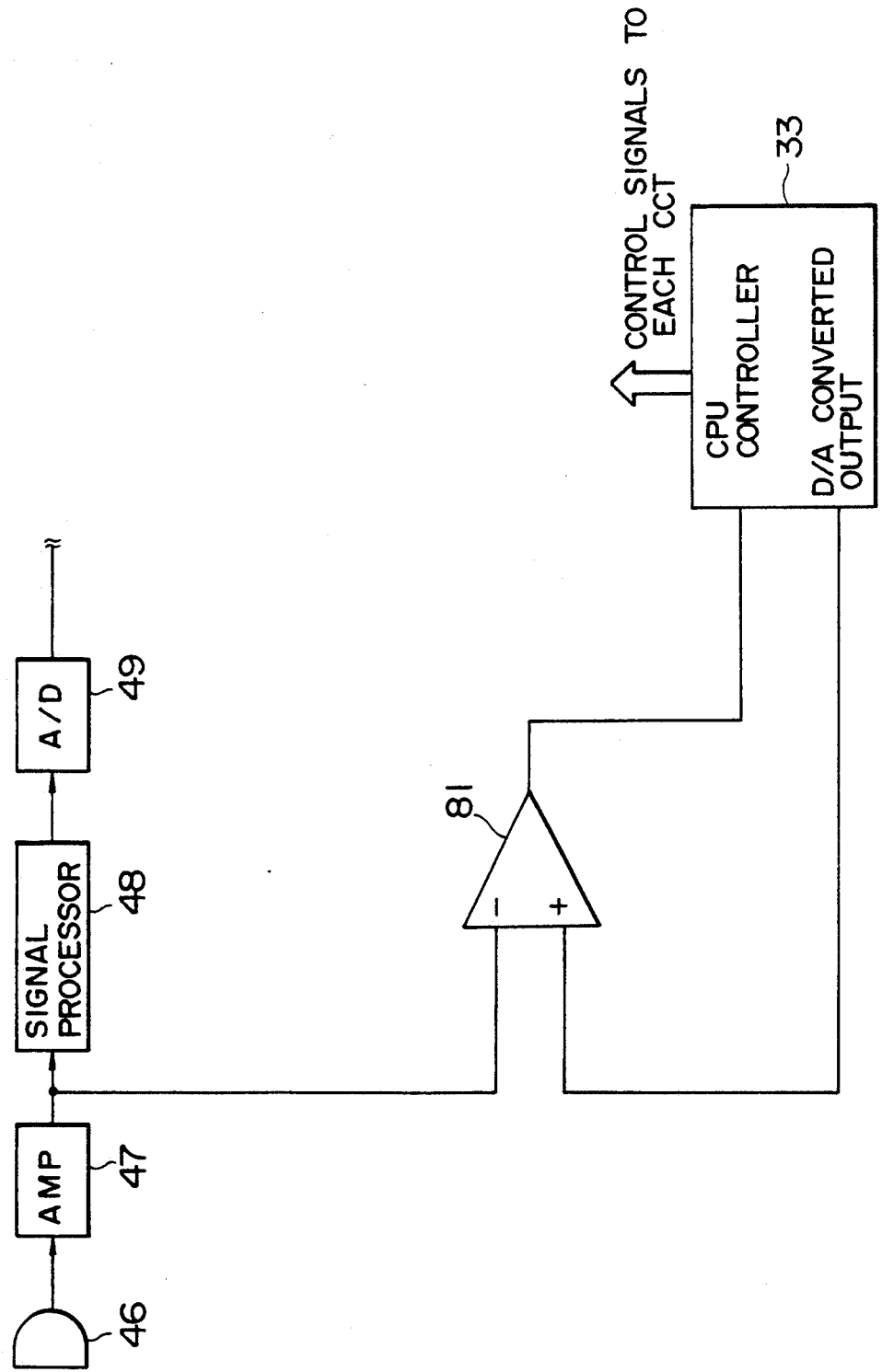
Figure 16:
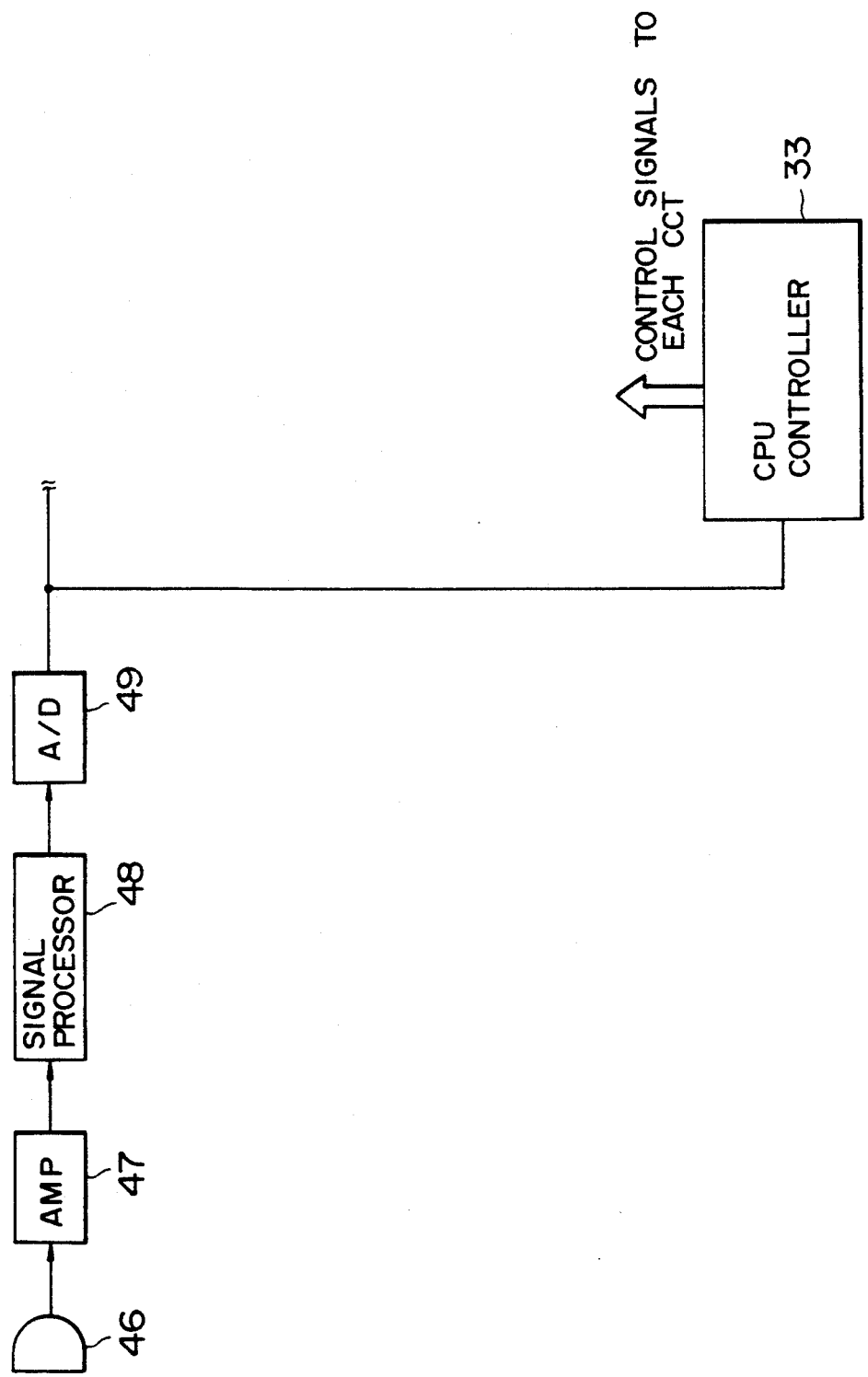

However, in the case of the above-described method, the setting level becomes constant, so that this method can not be adopted when recording and playback motions are conducted according to a plurality of setting levels as illustrated in FIG. 13. A plurality of setting levels can be compared with the actual sound level by the following method: as illustrated in FIG. 15, the output of the A/D converter built in the CPU controller 33 is inputted into the plus side of the above-described comparator 81 as illustrated in FIG. 15; at the outset, the voltage corresponding to the first setting level (Refer to FIG. 13.) is outputted to the comparator 81; when the output of the comparator 81 is reversed, it can be detected that the sound level has exceeded the first setting level; and then the voltage corresponding to the second setting level is outputted from the D/A converter to the comparator 81.

The sound level can be detected without using the hardware such as the comparator 81 in such a manner that : the A/D converted value of the sound signals inputted through the microphone 46 is outputted to the CPU controller 33; and the setting level and the sound signals are compared with each other by software processing.

Figure 17:
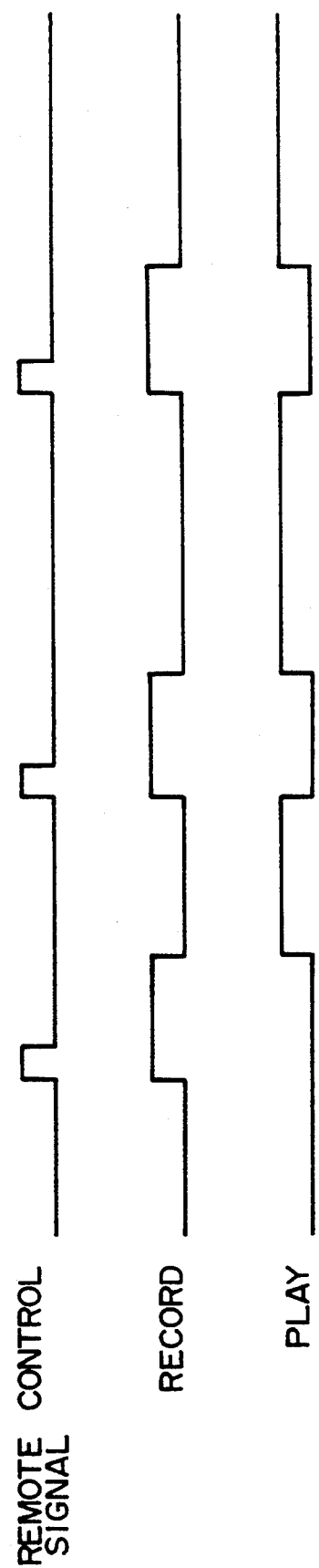
FIG. 17 is a time chart which shows the control conducted according to the remote control signal when recording and playing back are carried out.

Referring now to the time chart shown in FIG. 17, the recording and playback motions controlled by remote control signals will be explained as follows.

When AUTO REC & PLAY Mode is selected by the slide switch 21 illustrated in FIG. 3, the following motions are conducted: electric power is always supplied to the remote control receiver 32 which is a light receiving unit receiving remote control light through the remote control light receiving lens 10 (illustrated in FIG. 1 and FIG. 2) of the camera; the photographer presses the remote control transmitting switch 15 of the remote control switch box 14 so that the remote control optical signals, which are infrared rays, emitted by the infrared ray emitting LED 16, are inputted into the still video camera 1 through the above-described remote control light receiving lens 10; the camera 1 records and consecutively plays back images and sounds in accordance with the remote control direction which is a predetermined trigger signal; and the camera 1 is kept playing back the images and sounds until the remote control switch box 14 is operated again.

In the way described above, the still video camera of the present invention can record images and sounds, and automatically play back the images and sounds right after recording, so that when a party comes to a climax, for instance, the promoter of the party can operate the camera with the remote control device for photographing and play back the record in order to watch it on the TV screen.

Electric waves can be used for the remote control device as well as infrared rays.

Figure 18:
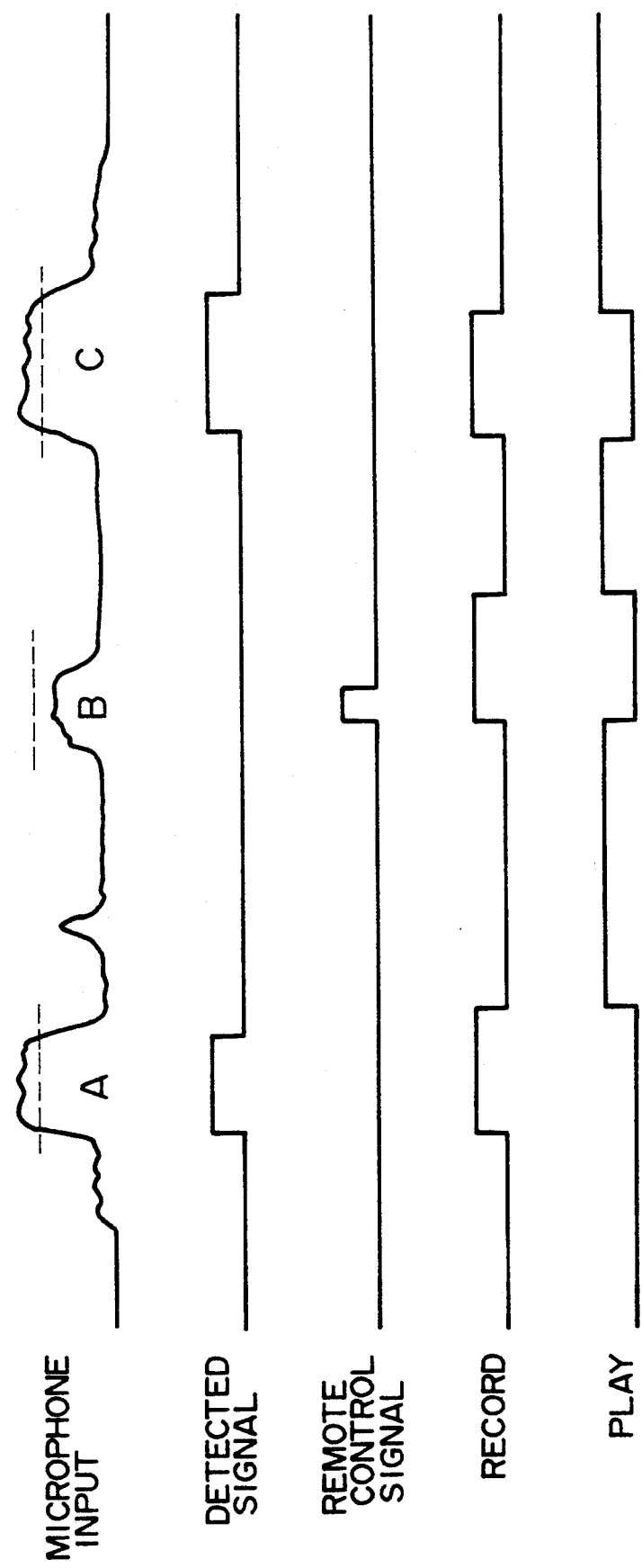
FIG. 18 a time chart which shows the control conducted when recording and playback control according to the sound level is combined with recording and playback control according to the remote control signal.

Next, referring to the time chart illustrated in FIG. 18, an example will be explained in which automatic recording and playback according to the sound level inputted through the microphone 46, and recording and playback according to remote control, are combined.

When AUTO REC & PLAY Mode is selected by the slide switch 21 shown in FIG. 3, the recording and playback can be conducted as follows: when the sound level inputted through the microphone 46 exceeds the setting level (in the case of A or C in FIG. 18), a detection signal is outputted; the detection signal is used as a trigger signal, and image and sound signals are automatically recorded and played back; and the playback is continued until the inputted sound level exceeds the setting level again.

However, in some cases, a photographer desires to take a picture even when the sound level does not reach the setting level. In this case, electric power is always supplied to the remote control light receiving unit in order to be prepared for photographing so that the camera can record and play back images and sound according to the direction of the photographer through the remote control unit.

In other words, either when the sound level exceeds the setting level or when a direction is given by the remote control unit, images and sound can be recorded and played back. Specifically, each time when the sound level exceeds the setting level, recording and playback can be automatically conducted and when a direction is given by the remote control unit, recording and playback can be conducted without any relation to the sound level.

Figure 19:
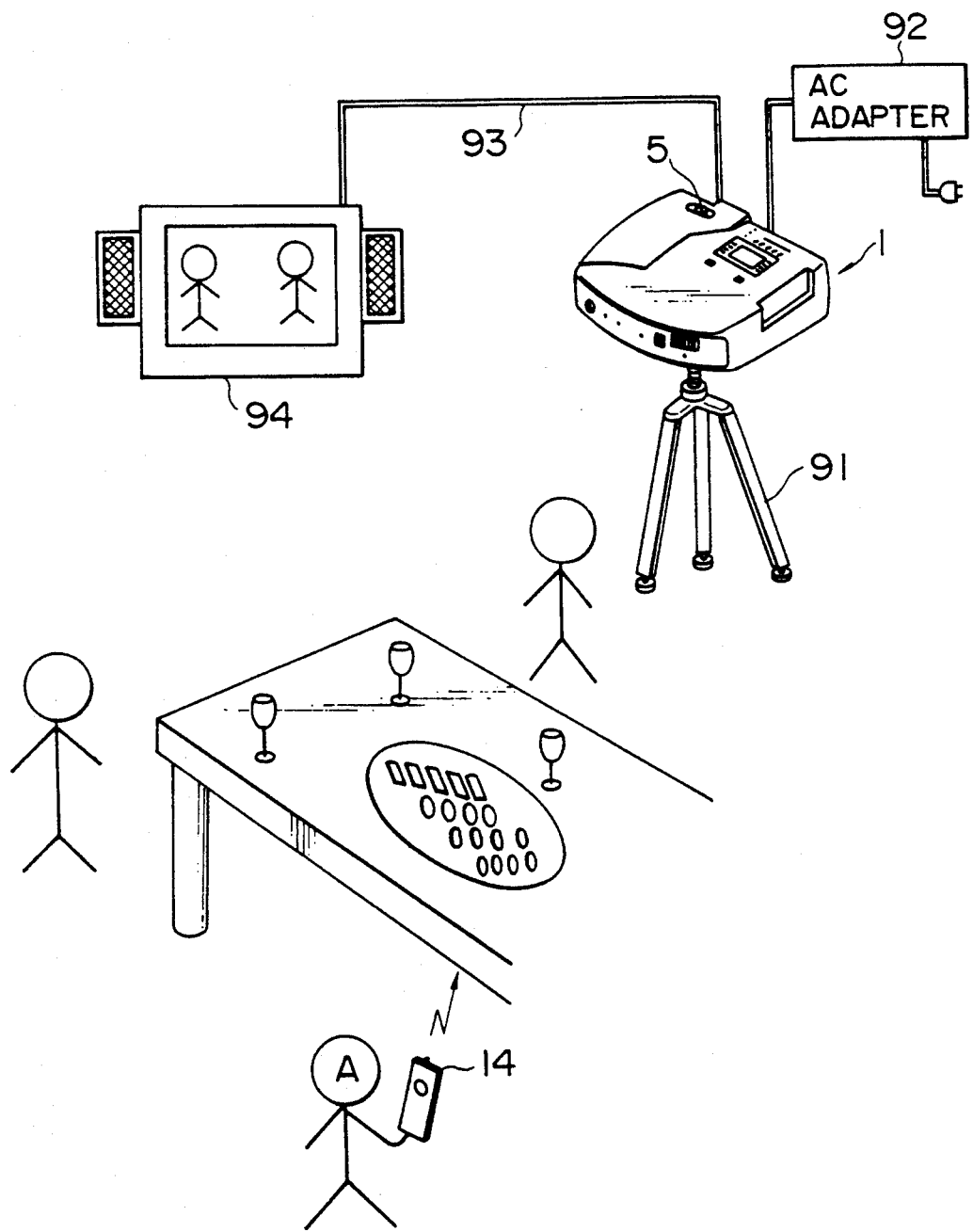
FIG. 19 is a perspective view which illustrates the camera of the present invention, wherein the camera is used for photographing.

FIG. 19 illustrates the still video camera 1 according to the above-described example, wherein the camera 1 is put into practical use. The still video camera 1 supported by the tripod 91, is set so as to take a picture in a party place, for instance. This still video camera 1 can be activated by a built-in battery. However, the still video camera 1 can be also activated by A.C. power source (the power source for domestic use) through A.C. adapter 92 so that it can be operated for a long period of time. In the way described above, when the still video camera 1 is driven by the power source for domestic use, the battery built in the camera is not consumed, so that the battery for strobe light can be always charged.

The still video camera 1 and the television set 93 are connected by the signal cable 93 for use in images and sounds. The signals of images and sounds played back by the still video camera 1 are inputted into the television set 94 through the above-described cable 93 and reproduced through CTR and the speaker of the television set 94.

In this case, party promoter "A", for instance, can record images and sounds, and play back the recorded images and sounds in the following ways. Promoter "A" holds the remote control switch box 14 which has been removed from the still video camera 1, and when necessary, the remote control box 14 is operated by "A", or the release button 5 of the still video camera 1 is directly operated in order to take a picture of the party. Right after that, "A" can play back the recorded images and sounds on a TV screen. Further, images and sounds can be automatically recorded and played back in accordance with the input level of the microphone 46 by selecting the mode of the still video camera.

In the examples described above, the still video camera 1 by which both images and sounds can be recorded and played back, has been explained. However, the present invention can be applied to a camera to which the recording and playback function of sounds is not provided. In the case of the camera to which the sound recording and reproducing function is not provided, automatic recording and reproducing according to the sound level can not be conducted, so that recording and reproducing at regular intervals, and recording and reproducing operated by remote control can be applied. In a still video camera which does not have the function of recording and reproducing sounds, a microphone by which a predetermined trigger signal used for recording and reproducing images, may be provided.

In this example, a floppy disk is used as a recording medium for analogous recording. However, a semiconductor memory may be used for digital recording.

Furthermore, in the above-described example, right after a predetermined trigger signal is inputted, the recorded signals are played back, and the playback is continued until the following trigger signal is inputted. However, it is possible to play back for a predetermined period of time.

A mode may be provided in which recorded images and sounds can be automatically played back even when recording has been conducted by a common operation of the release button 5. In this case, the release button operation signal is used as a predetermined trigger signal.

As explained above, according to the present invention, in a still video camera having the function of recording and reproducing, recording and reproducing the recorded signals are consecutively conducted at regular intervals, or when the sound level has exceeded a predetermined level, or a predetermined trigger signal has been outputted by a remote control operation. Consequently, recording and reproducing can be consecutively conducted without directly operating the camera, so that the burden of a photographer can be lightened and the camera can be used not only for recording use but also for attractive use in a party.

What is claimed is:

1. A still video camera, comprising:
   selecting means for selecting an operation mode from a plurality of operation modes including a record-play mode;

trigger means for generating a trigger signal which automatically repeats at selected predetermined time intervals; and video means responsive to each trigger signal for recording a frame of a subject image and playing back the recorded frame of the subject image subsequent to each recording at times when the record-play mode is selected.

2. The still video camera of claim 1, wherein the trigger means generates the trigger signal in response to a sound amplitude level greater than a predetermined amplitude level.

3. The still video camera of claim 1, further comprising:
 a remote controlling means for generating and transmitting a remote control signal; and
 a receiving means for receiving and applying the remote control signal to the trigger means, whereby the trigger means generates the trigger signal in response to the remote control signal.

4. The still video camera of claim 1, further comprising:
 an audio recording means for recording and playing back an audible signal synchronized with the recording and playing back of the subject image 5. The still video camera of claim 2, further comprising:
 a remote controlling means for generating and transmitting a remote control signal; and
 a receiving means for receiving and applying the remote control signal to the trigger means, whereby the trigger means generates the trigger signal in response to the remote control signal.

6. A still video camera, comprising:
 selecting means for selecting an operation mode from a plurality of operation modes including a record-play mode;
 trigger means for generating a trigger signal in response to a sound amplitude level greater than a predetermined amplitude level;
 video means responsive to each trigger signal for recording a frame of a subject image and playing back the recorded frame of the subject image subsequent to each recording at times when the record-play mode has been selected; and
 audio recording means for recording and playing back an audible signal synchronized with the recording a playing back of the subject image.

7. The still video camera of claim 6, wherein the trigger means generates the trigger signal at selected predetermined time intervals.

8. The still video camera of claim 7, further comprising:
 a remote controlling means for generating and transmitting a remote control signal; and
 a receiving means for receiving and applying the remote control signal to the trigger means, whereby the trigger means generates the trigger signal in response to the remote control signal.

9. The still video camera of claim 6, further comprising:
 a remote controlling means for generating and transmitting a remote control signal; and
 a receiving means for receiving and applying the remote control signal to the trigger means, whereby the trigger means generates the trigger signal in response to the remote control signal.

10. A still video camera, comprising:
 selecting means for selecting an operation mode from a plurality of operation modes including a record-play mode;
 trigger means for generating a trigger signal generating the trigger signal in response to a sound amplitude level greater than a predetermined amplitude level; and
 video means responsive to each trigger signal for recording a frame of a subject image and playing back the recorded frame of the subject image subsequent to each recording at times when the record-play mode has been selected.

11. The still video camera of claim 10, further comprising a remote controlling means for generating and transmitting a remote control signal; and
 a receiving means for receiving and applying the remote control signal to the trigger means, whereby the trigger means generates the trigger signal in response to the remote control signal.

12. A still video camera, comprising:
 selecting means for selecting an operator mode from a plurality of operation modes including a record-play mode;
 trigger means for generating a trigger signal at selected time intervals in response to a sound amplitude level greater than a predetermined amplitude level; and
 video means responsive to each trigger signal for recording a frame of a subject image and playing back the recorded frame of the subject image subsequent to each recording at times when the record-play mode is selected.

* * * * *